(12) United States Patent
Coakley et al.

(10) Patent No.: US 11,541,786 B2
(45) Date of Patent: Jan. 3, 2023

(54) INFANT CARRIER

(71) Applicant: Dorel Juvenile Group, Inc., Foxboro, MA (US)

(72) Inventors: Devin J. Coakley, Bellingham, MA (US); Nathan W. Heisey, Seymour, IN (US); Jason H. Johnson, Brownstown, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 100 days.

(21) Appl. No.: 16/937,885

(22) Filed: Jul. 24, 2020

(65) Prior Publication Data

US 2021/0023969 A1 Jan. 28, 2021

Related U.S. Application Data

(60) Provisional application No. 62/878,429, filed on Jul. 25, 2019, provisional application No. 62/904,105, filed on Sep. 23, 2019, provisional application No. 62/937,845, filed on Nov. 20, 2019.

(51) Int. Cl.
*B60N 2/28* (2006.01)
*A47D 13/02* (2006.01)

(52) U.S. Cl.
CPC .......... *B60N 2/2845* (2013.01); *A47D 13/02* (2013.01); *A47D 13/025* (2013.01); *B60N 2/2806* (2013.01); *B60N 2/2821* (2013.01); *B60N 2/2872* (2013.01)

(58) Field of Classification Search
CPC ..... A47D 13/02; A47D 13/025; B60N 2/2845

USPC ....................................................... 297/183.3
See application file for complete search history.

(56) References Cited

U.S. PATENT DOCUMENTS

| 3,596,986 A | 8/1971 | Ragsdale | |
| 5,806,924 A * | 9/1998 | Gonas | B60N 2/286 297/250.1 |
| 5,893,606 A | 4/1999 | Chiang | |
| 6,017,088 A | 1/2000 | Stephens | |
| 6,199,949 B1 | 3/2001 | Dasilva | |
| 6,375,260 B1 | 4/2002 | Hiramatsu | |
| 6,386,632 B1 * | 5/2002 | Goor | B60N 2/2863 297/256.16 |
| 6,517,153 B1 | 2/2003 | Brewer | |
| 6,715,828 B1 | 4/2004 | Cheng | |
| 6,910,696 B2 | 6/2005 | Bargery | |

(Continued)

FOREIGN PATENT DOCUMENTS

| DE | 102004049919 A1 | 4/2006 |
| EP | 1175858 A2 | 1/2002 |

(Continued)

OTHER PUBLICATIONS

Netherlands Search Report for Netherlands App. No. NL2023470 dated Mar. 4, 2020, DN-139 NL, 7 pages.

(Continued)

*Primary Examiner* — Milton Nelson, Jr.
(74) *Attorney, Agent, or Firm* — Barnes & Thornburg LLP (57) ABSTRACT

An infant carrier is included in a child restraint that may also include a carrier-mount base adapted to be anchored to a passenger seat in a vehicle. The infant carrier includes a shell for holding an infant and a carry handle coupled to the shell and adapted to be gripped by a caregiver.

16 Claims, 11 Drawing Sheets

(56) References Cited

U.S. PATENT DOCUMENTS

| | | | |
|---|---|---|---|
| 6,913,313 B2* | 7/2005 | Sedlack | A47D 13/02 297/183.1 |
| 7,488,034 B2 | 2/2009 | Ohren | |
| 7,597,396 B2 | 10/2009 | Longenecker | |
| 8,070,228 B2 | 12/2011 | Karremans | |
| 8,186,757 B2 | 5/2012 | Duncan | |
| 8,702,169 B2 | 4/2014 | Abadilla | |
| 8,714,639 B2 | 5/2014 | Heisey | |
| 8,911,015 B2 | 12/2014 | Cohen | |
| 8,998,312 B2 | 4/2015 | Sellers | |
| 9,056,567 B2 | 6/2015 | Wuerstl | |
| 9,066,610 B2 | 6/2015 | Duan | |
| 9,119,483 B1 | 9/2015 | Heisey | |
| 9,597,986 B2 | 3/2017 | Hou | |
| 9,771,006 B2 | 9/2017 | Forbes | |
| 9,771,007 B2 | 9/2017 | Shellenberger | |
| 10,028,592 B1 | 7/2018 | Ruiz | |
| 10,220,734 B2 | 3/2019 | Cohen | |
| 10,363,842 B2 | 7/2019 | Anderson | |
| 10,377,274 B2 | 8/2019 | Anderson | |
| 11,034,266 B2 | 6/2021 | Heisey | |
| 11,134,793 B2 | 10/2021 | Smith | |
| 2009/0295128 A1 | 12/2009 | Nagelski | |
| 2010/0225150 A1 | 9/2010 | Duncan | |
| 2010/0230933 A1 | 9/2010 | Dean | |
| 2010/0231019 A1 | 9/2010 | Berkey | |
| 2014/0084649 A1 | 3/2014 | Guo | |
| 2014/0265255 A1 | 9/2014 | Wang | |
| 2014/0292049 A1 | 10/2014 | St. Pierre | |
| 2015/0266399 A1 | 9/2015 | Lake | |
| 2016/0031343 A1* | 2/2016 | Juchniewicz | B60N 2/2887 297/250.1 |
| 2017/0065098 A1 | 3/2017 | Taylor | |
| 2018/0056823 A1 | 3/2018 | Anderson | |
| 2018/0186254 A1 | 7/2018 | Chen | |
| 2018/0334059 A1 | 11/2018 | Churilla | |
| 2020/0260884 A1 | 8/2020 | Smith | |
| 2020/0269733 A1 | 8/2020 | Heisey | |
| 2020/0307423 A1* | 10/2020 | Abro | B60N 2/643 |
| 2021/0023969 A1 | 1/2021 | Coakley | |

FOREIGN PATENT DOCUMENTS

| | | | |
|---|---|---|---|
| EP | 1259396 A1 | 11/2002 | |
| EP | 1591306 A2 * | 11/2005 | A47D 13/025 |
| EP | 1591307 A2 | 11/2005 | |
| EP | 1837230 B1 | 9/2007 | |
| EP | 1969974 B1 | 9/2008 | |
| EP | 1974988 B1 | 10/2008 | |
| EP | 2108566 B1 | 10/2009 | |
| EP | 2210768 B1 | 7/2010 | |
| GB | 2429401 A | 2/2007 | |
| WO | 199707716 A1 | 3/1997 | |
| WO | 200164471 A1 | 9/2001 | |
| WO | 2006094341 A1 | 9/2006 | |
| WO | 2017029273 A1 | 2/2017 | |

OTHER PUBLICATIONS

Office Action (Non-Final Rejection) dated Feb. 11, 2022 for U.S. Appl. No. 16/922,302, DN-139 US-U II, (pp. 1-10).
Office Action (Non-Final Rejection) dated Sep. 8, 2022 for U.S. Appl. No. 16/937,736, (pp. 1-5).
Office Action dated Sep. 15, 2021 for U.S. Appl. No. 16/922,407 (pp. 1-9).
Office Action dated Sep. 15, 2021 for U.S. Appl. No. 16/938,196 (pp. 1-14).
Office Action dated Nov. 4, 2021 for U.S. Appl. No. 16/922,302, (pp. 1-12).
Office Action dated Jun. 9, 2021 for U.S. Appl. No. 16/938,196 (pp. 1-11).

* cited by examiner

INFANT CARRIER

PRIORITY CLAIM

This application claims priority under 35 U.S.C. § 119(e) to U.S. Provisional Application Ser. No. 62/878,429, filed Jul. 25, 2019, U.S. Provisional Application Ser. No. 62/904,105, filed Sep. 23, 2019, U.S. Provisional Application No. 62/937,845, filed Nov. 20, 2019, each of which is expressly incorporated by reference herein.

BACKGROUND

The present disclosure relates to child restraints, and particularly to child restraints that are used to restrain infant children. More particularly, the present disclosure relates to infant carriers that may be mounted on a base or a passenger seat in a vehicle and that can be separated from the base or passenger seat and used by a caregiver to carry the infant away from the vehicle.

SUMMARY

A child restraint in accordance with the present disclosure includes an infant carrier. In illustrative embodiments, the infant carrier can be mounted on a stationary carrier-mount base that is anchored to a passenger seat in a vehicle or tethered to the passenger seat using vehicle lap and shoulder belts to restrain an infant seated in the infant carrier during transport in the vehicle. The infant carrier also can be separated from the carrier-mount base or the vehicle lap and shoulder belts to allow a caregiver to transport the infant seated in the infant carrier away from the vehicle using a carry handle included in the infant carrier.

In illustrative embodiments, the infant carrier includes a carrier shell and a U-shaped carry handle. The carrier shell provides a space for supporting an infant. The carry handle is mounted on the carrier shell for pivotable movement about a handle-pivot axis between an extended child-carrying position and a retracted handle-storage position. The carrier shell include alcoves formed in a perimeter rim for receiving opposite handle ends of the carry handle so that those handle ends are flush with or inset in the perimeter rim and do not protrude laterally outwardly to hit the leg or body of a caregiver carrying the infant carrier.

In illustrative embodiments, each handle end of the pivotable U-shaped carry handle lies within a companion perimeter alcove formed in the carrier shell when the U-shaped carry handle is pivoted to assume the extended child-carrying position without protruding substantially beyond the side of the carrier shell that is adjacent to the companion perimeter alcove. The handle end lies within the perimeter alcove so that it does not project outwardly beyond the side of the carrier shell to hit the leg or body of a caregiver holding the carry handle to transport an infant restrained in the carrier shell.

In illustrative embodiments, the carrier shell includes a top rim that is arranged to extend along an upper perimeter of the carrier shell. The top rim includes an outwardly facing exterior side wall that is conceived of as generally straight. A first perimeter alcove sized to receive a first handle end of the pivotable carry handle is formed by an indentation in the outwardly facing exterior side wall of the top rim of the carrier shell so that the first handle end remains substantially within the first perimeter alcove without protruding laterally outwardly beyond the outwardly facing exterior side wall of the top rim in a way that would cause the first handle end to hit the adjacent leg or body of a caregiver holding the carry handle to transport an infant restrained in the carrier shell.

In illustrative embodiments, the first handle end of the carry handle is a first pivot hub that is mounted on one side of the carrier shell in the first perimeter alcove for rotation about the handle-pivot axis. The carry handle also includes a second handle end that provides a second pivot hub mounted on an opposite side of the carrier shell in a second perimeter alcove for rotation about the handle-pivot axis. The carry handle further includes a U shaped bail coupled to each of the first and second pivot hubs to rotate therewith. Each pivot hub remains in its companion perimeter alcove when the carry handle occupies the extended child-carrying position without projecting laterally outwardly beyond an adjacent side of the carrier shell to hit or rub against the leg or body of a caregiver that is carrying the infant carrier.

In illustrative embodiments, the bail includes a first grip-support arm coupled to the first pivot hub to rotate therewith, a second grip-support arm coupled to the second pivot hub to rotate therewith, and a handgrip arranged to interconnect free ends of the first and second grip-support arms. A caregiver can move the handgrip in a first direction toward a head end of the carrier shell to pivot the carry handle in a first direction about the handle-pivot axis to assume the retracted handle-storage position in which the U shaped bail extends around the head-end of the carrier shell. Alternatively, the caregiver can more the handgrip in an opposite direction away from the head end of the carrier shell to pivot the carry handle in a second direction about the handle-pivot axis to assume the extended child-carrying position in which the U shaped bail extends upwardly over the infant-supporting space formed in the carrier shell to allow the caregiver to hold the carry handle by the handgrip and transport an infant placed in the infant-supporting space of the carrier shell.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which.

DETAILED DESCRIPTION

Figure 1:
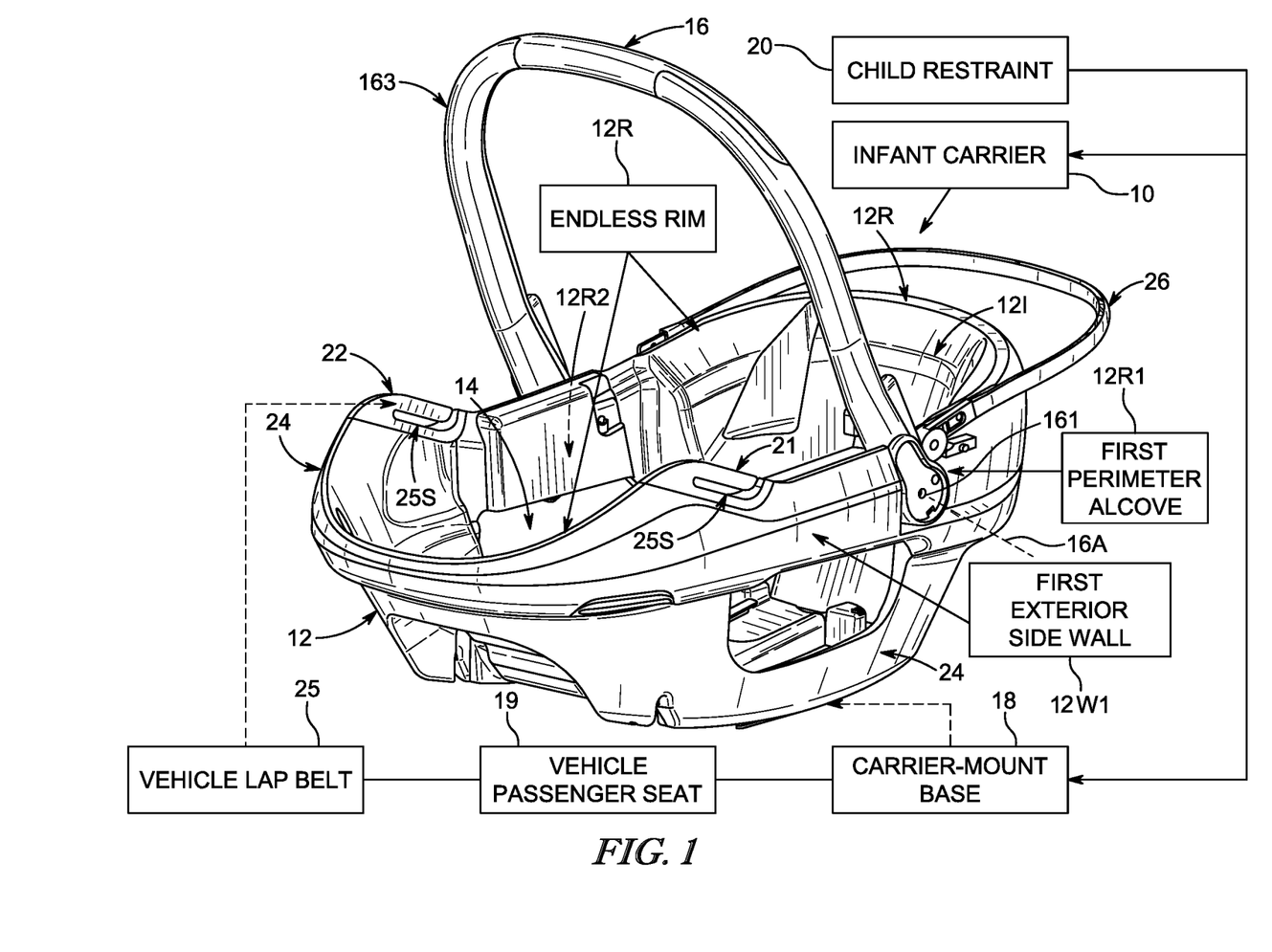
FIG. 1 is a front perspective view of a child restraint including an infant carrier in accordance with a first embodiment of the present disclosure showing that a first pivot hub of a carry handle is inset in a first perimeter alcove provided by a first handle-receiver channel formed in an endless rim of a carrier shell so that an outwardly facing exterior hub side face of the first pivot hub lies in the first handle-receiver channel without substantially protruding beyond an adjacent outwardly facing first exterior side wall of the endless rim.

An infant carrier 10 in accordance with a first embodiment of the present disclosure includes a carrier shell 12, an infant support 14 configured to fit in an interior region 121 of carrier shell 12 to hold an infant (not shown) placed in carrier shell 12, and a carry handle 16 mounted on carrier shell 12 for pivotable movement about a handle-pivot axis 16A as shown in FIG. 1. First and second handle ends 161, 162 of the carry handle 16 are positioned to lie in companion first and second alcoves 12R1, 12R2 formed in a top perimeter rim 12R of carriershell 12 when carry handle 16 is moved to assume an upright extended child-carrying position as suggested in FIGS. 1 and 5. An infant carrier 210 in accordance with a second embodiment of the present disclosure is illustrated in FIGS. 7-12B. An infant carrier 310 in accordance with a second embodiment of the present disclosure is illustrated in FIGS. 13-17.

Infant carrier 10 may be mounted by a caregiver in any suitable manner on a carrier-mount base 18 that is anchored in a stationary position on a vehicle passenger seat 19 to provide a child restraint 20 as suggested diagrammatically in FIG. 1. Infant carrier 10 and carrier-mount base 18 cooperate to form a child restraint 20 as suggested in FIG. 1. Alternatively, infant carrier 10 can be retained on a vehicle passenger seat 19 using a vehicle lap belt 25 passing through first and second belt receivers 21, 22 included in carrier shell 12 in accordance with the present disclosure without using carrier-mount base 18. Infant carrier 10 can be separated from carrier-mount base 18 or otherwise decoupled from vehicle lap belt 25 so that the caregiver can use carry handle 16 to transport an infant restrained on infant support 14 in carrier shell 12 away from a passageway seat 19 in a vehicle (not shown). First and second belt receivers 21, 22 are mounted in the top perimeter rim 12R that is included in a shell body 24 that is also included in carrier shell 12.

First and second belt receivers 21, 22 are inset into cut-outs formed in shell body 24 and mated with shell body 24 to form carrier shell 12 as suggested in FIG. 1. Each belt receiver 21, 22 is formed to include a belt-path slot 25S for receiving a portion of vehicle lap belt 25 so that lap belt 25 anchors infant carrier 10 to vehicle passenger seat 19 when infant carrier 10 is desired to be restrained on vehicle passenger seat 19 without using carrier-mount base 18.

Infant carrier 10 includes a carrier shell 12 and a U-shaped carry handle 16 as shown in FIG. 1. Carrier shell 12 provides a space 121 for supporting an infant (not shown). Carry handle 16 is mounted on carrier shell 12 for pivotable movement about a handle-pivot axis 16A between an extended child-carrying position shown in FIGS. 1 and 2 and a retracted handle-storage position shown in FIG. 3. Carrier shell 12 includes recesses formed in a perimeter rim 12R to provide first and second alcoves 12R1, 12R2 for receiving opposite handle ends 161, 162 of carry handle 16 so that those handle ends 161, 162 are flush with or inset in the perimeter rim 12R and do not protrude laterally outwardly to hit the leg or body of a caregiver carrying the infant carrier 10.

Figures 4, 5:
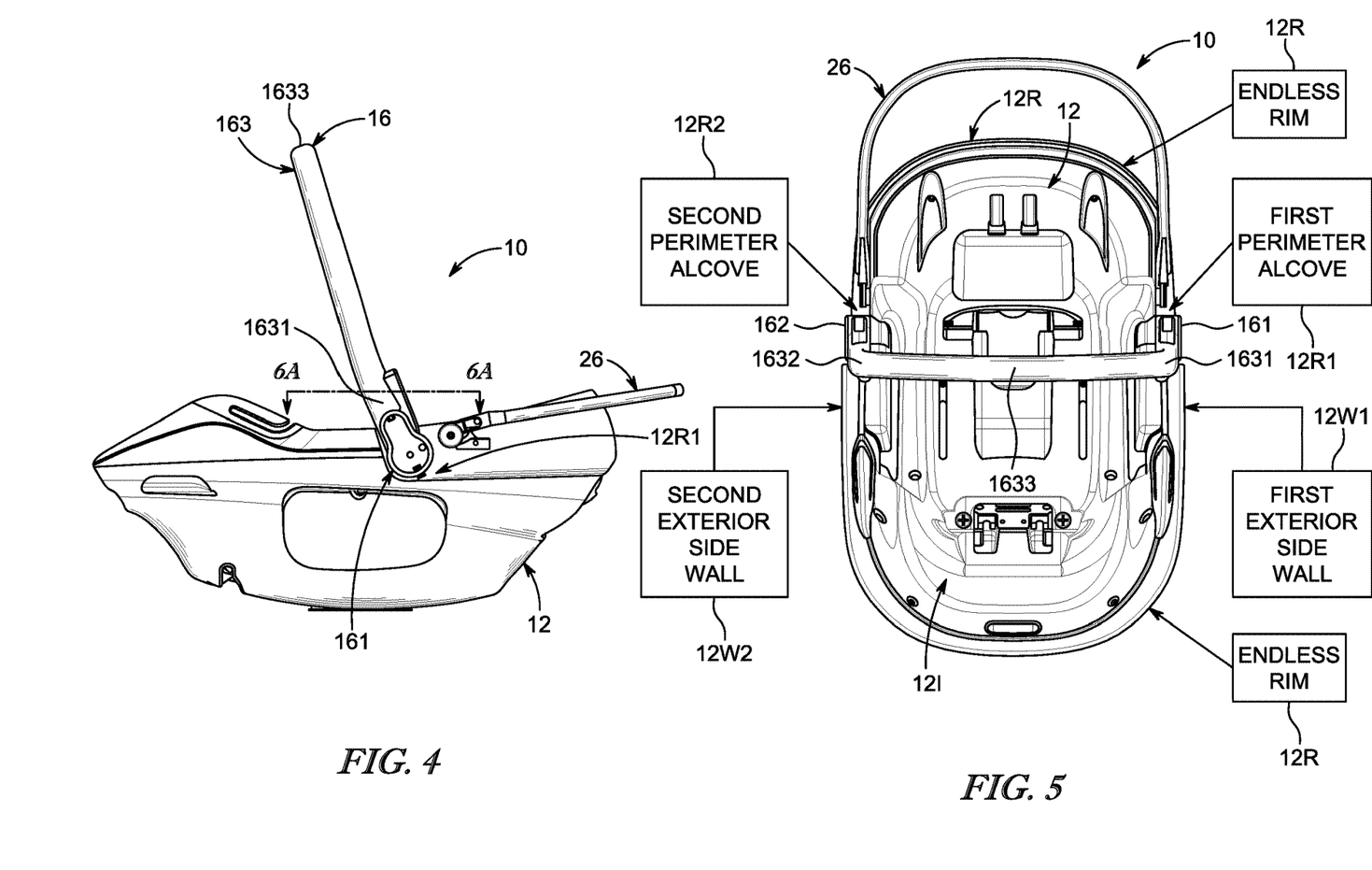
FIG. 4 is a side elevation view of the infant carrier of FIG. 3.
FIG. 5 is a top plan view of the infant carrier of FIGS. 3 and 4 showing that a second perimeter alcove is formed in the endless rim of the carrier shell to receive a second pivot hub (i.e. handle end) of the carry handle so that an outwardly facing exterior hub side face of the second pivot hub lies in the second perimeter alcove without substantially protruding beyond an adjacent outwardly facing second exterior side wall of the endless rim.
Figure 6A:
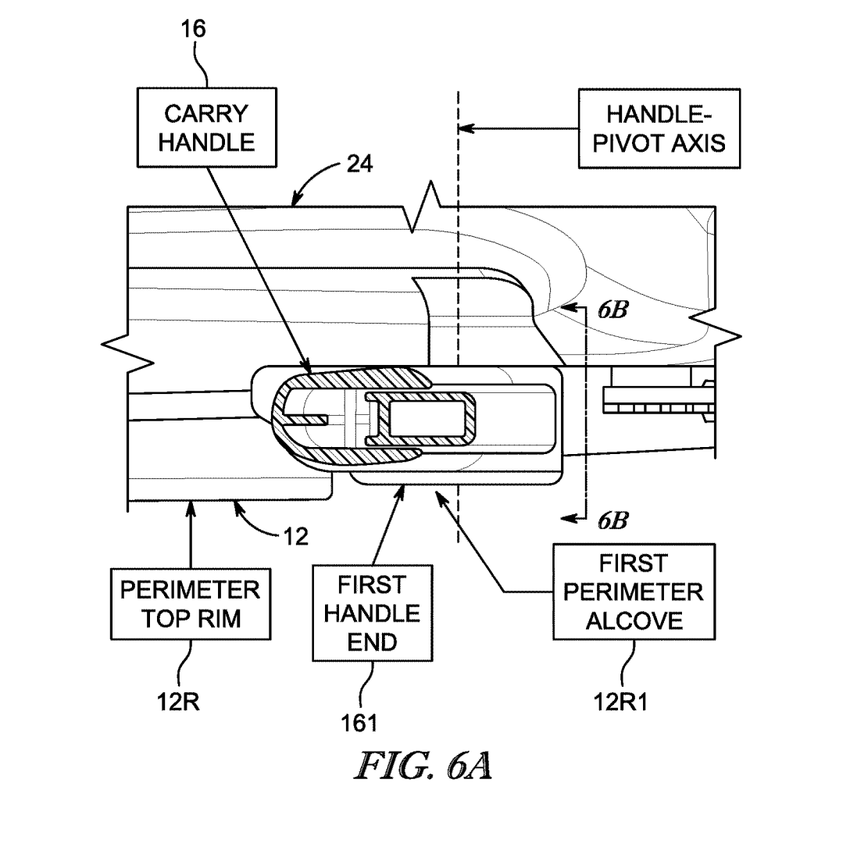
FIG. 6A is a sectional second view taken along line 6-6 of FIG. 1 to show that the first pivot hub does not protrude outwardly along the handle-pivot axis beyond the adjacent outwardly facing first exterior side wall of the endless rim of the carrier shell when the carry handle occupies the extended child-carrying position.
Figure 6B:
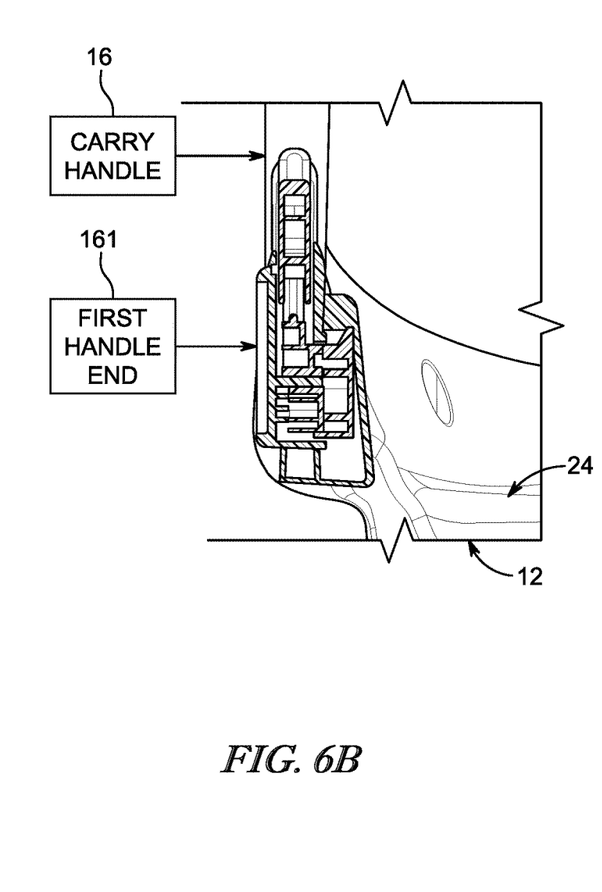
FIG. 6B is a sectional view taken along line 6B-6B of FIG. 6A.

Each handle end 161, 162 of the pivotable U-shaped carry handle 16 lies within a companion perimeter alcove 12R1 or 12R2 formed in carrier shell 12 when the U-shaped carry handle 16 is pivoted to assume the extended child-carrying position without protruding substantially beyond the side of carrier shell 12 that is adjacent to the companion perimeter alcove 12R1, 12R2 as suggested in FIG. 5. The handle end 161 or 162 does not project outwardly beyond the side of carrier shell 12 to hit the leg or body of a caregiver holding the carry handle 16 to transport an infant restrained in carrier shell 12.

Carrier shell 12 includes a top rim 12R that is arranged to extend along an upper perimeter of carrier shell 12. Top rim 12R includes an outwardly facing first exterior side wall 12W1 that is conceived of as generally straight as shown in FIGS. 1 and 5. A first perimeter alcove 12R1 sized to receive first handle end 161 of the pivotable carry handle 16 is formed by an indentation in the outwardly facing first exterior side wall 12W1 of top rim 12R of carrier shell 12 as shown in FIGS. 2 and 3 so that the first handle end 161 remains substantially within the first perimeter alcove 12R1 without protruding laterally outwardly beyond the outwardly facing first exterior side wall 12W1 of top rim 12R as shown in FIG. 5 in a way that would cause the first handle end 161 to hit the adjacent leg or body of a caregiver holding the carry handle 16 to transport an infant restrained in carrier shell 12.

Top rim 12R of carrier shell 12 also includes an outwardly facing second exterior side wall 12W2 that is conceived of as generally straight as shown in FIG. 5. A second perimeter alcove 12R2 sized to receive second handle end 162 of the pivotable carry handle 16 is formed by an indentation in the outwardly facing second exterior side wall 12W2 of top rim 12R of carrier shell 12 as suggested in FIG. 5 so that the second handle end 162 remains substantially within the second perimeter alcove 12R2 without protruding laterally outwardly beyond the outwardly facing second exterior side wall 12W2 of top rim 12R in a way that would cause the second handle end 162 to hit the adjacent leg or body of a caregiver holding the carry handle 16 to transport an infant restrained in carrier shell 12.

Figure 2:
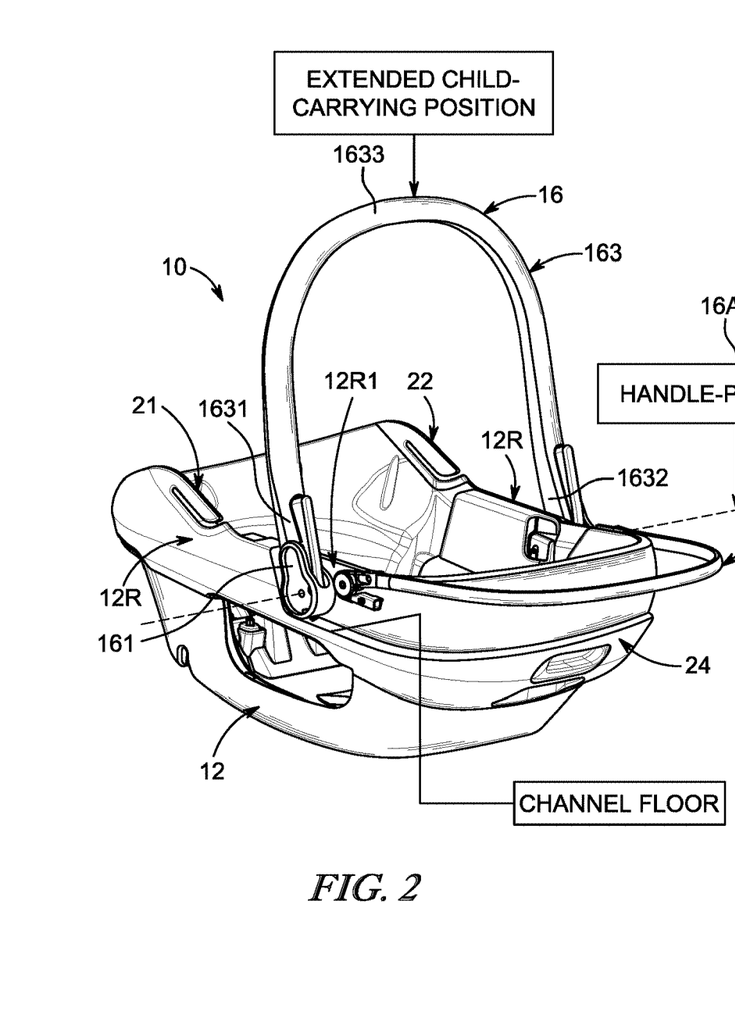
FIG. 2 is a rear perspective view of the infant carrier of FIG. 1 showing the carry handle in an extended child-carrying position that is arranged to extend upwardly away from the endless rim of the carrier shell and showing that the first pivot hub is located in the first handle-receiver channel above a channel floor defining a lower boundary of the first handle-receiver channel.
Figure 3:
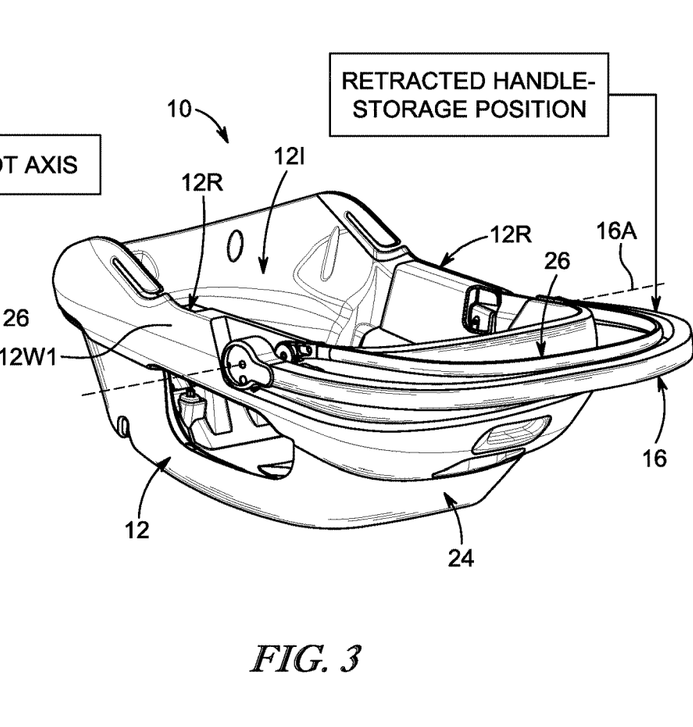
FIG. 3 is a perspective view similar to FIG. 2 showing the carry handle after it has been pivoted about a handle-pivot axis by a caregiver to assume a retracted handle-storage position and showing that the first pivot hub remains in an inset position in the first handle-receiver channel without protruding substantially beyond the adjacent outwardly facing first exterior side wall of the endless rim of the child carrier.

First handle end 161 of carry handle 16 is a first (pivot) hub that is mounted on one side of carrier shell 12 in the first perimeter alcove 12R1 for rotation about handle-pivot axis 16A as shown in FIGS. 2 and 3. Carry handle 16 also includes a second handle end 162 that provides a second (pivot) hub mounted on an opposite side of carrier shell 12 in a second perimeter alcove 12R2 for rotation about handle-pivot axis 16A. Carry handle further includes a U shaped bail 163 coupled to each of the first and second hubs 161, 162 to rotate therewith about handle-pivot axis 16A. Each pivot hub 161, 162 remains in its companion perimeter alcove 12R1 or 12R2 when carry handle 16 occupies the extended child-carrying position without projecting laterally outwardly beyond an adjacent side 12W1 or 12W2 of carrier shell 12 to hit or rub against the leg or body of or caregiver that is carrying the infant carrier 10.

Bail 163 includes a first grip-support arm 1631 coupled to first pivot hub 161 to rotate therewith, a second grip-support arm 1632 coupled to second pivot hub 162 to rotate therewith, and a handgrip 1633 arranged to interconnect free ends of the first and second grip-support arms 1631, 1632 as suggested in FIGS. 2 and 5. A caregiver can move the handgrip 1633 in a first direction toward a head end of carrier shell 12 to pivot carry handle 16 in a clockwise direction about the handle-pivot axis 16A to assume the retracted handle-storage position in which the U-shaped bail 163 extends around head-end of the carrier shell 12 as suggested in FIG. 3. Alternatively, the caregiver can move handgrip 163 in an opposite direction away from the head end of carrier shell 12 to pivot carry handle 16 in a counterclockwise direction about the handle-pivot axis 16A to assume the extended child-carrying position in which the U-shaped bail 163 extends upwardly over the infant-supporting space 121 formed in carrier shell 12, as suggested in FIGS. 1, 2, 4, and 5, to allow the caregiver to hold carry handle 16 by handgrip 163 and transport an infant placed in the infant-supporting space 121 of carrier shell 12.

Infant carrier 10 also includes a canopy frame 26 that is pivotably coupled to shell body 24 as suggested in FIG. 1. Any suitable canopy cover 28 is coupled to canopy frame 26 to open and close in response to pivotable movement of canopy frame 26 about a frame-pivot axis 26A.

Carrier shell 12 includes a basin 24 and an endless rim 12R coupled to an upper edge of basin 24 and configured to cooperate with basin 24 to form infant-supporting space 121 as suggested in FIG. 1. Endless rim 12R is formed to include an outwardly facing first exterior side wall 12W1 and a recessed first handle-receiver channel 12R1 interrupting the outwardly facing first exterior side wall 12W1 to provide a first alcove (means) space 12R1 for receiving all of the first pivot hub 161 when carry handle 16 is pivoted to assume the extended child-carrying position. The first handle-receiver channel 12R1 is formed to lie in a region located between the infant-receiving space 121 and the outwardly facing first exterior side wall 12W1 as suggested in FIG. 5.

First pivot hub 161 is arranged to extend into a first recessed handle-receiver channel 12R1 formed in a first side rail included in endless rim 12R of carrier shell 12 so as not to protrude outwardly along handle-pivot axis 16A beyond the adjacent outwardly facing first exterior side wall 12W1 of the first side rail as suggested in FIG. 5. An outwardly facing exterior hub side wall 12S1 of first pivot hub 161 is flush with or inset from the outwardly facing exterior first side wall 12W1 of a portion of the first side rail of endless rim 12R that is adjacent to first pivot hub 161 so as to increase comfort of a caregiver when the caregiver holds handgrip 1633 to carry the carrier shell 12 and the first pivot hub 161 in close proximity to the legs or body of the caregiver.

Second pivot hub 162 is arranged to extend into a second recessed handle-receiver channel 12R2 formed in a second side rail included in endless rim 12R of carrier shell 12 so as not to protrude outwardly along handle-pivot axis 16A beyond the adjacent outwardly facing second exterior side wall 12W2 of the second side rail as suggested in FIG. 5. An outwardly facing exterior hub side wall 12S2 of second hub 162 is flush with or inset from the outwardly facing second exterior side wall 12W2 of a portion of the second side rail of endless rim 12R that is adjacent to second pivot hub 162 so as to increase comfort of a caregiver when the caregiver holds handgrip 1633 to carry the carrier shell 12 and the second pivot hub 162 in close proximity to the legs or body of the caregiver.

Figure 7:
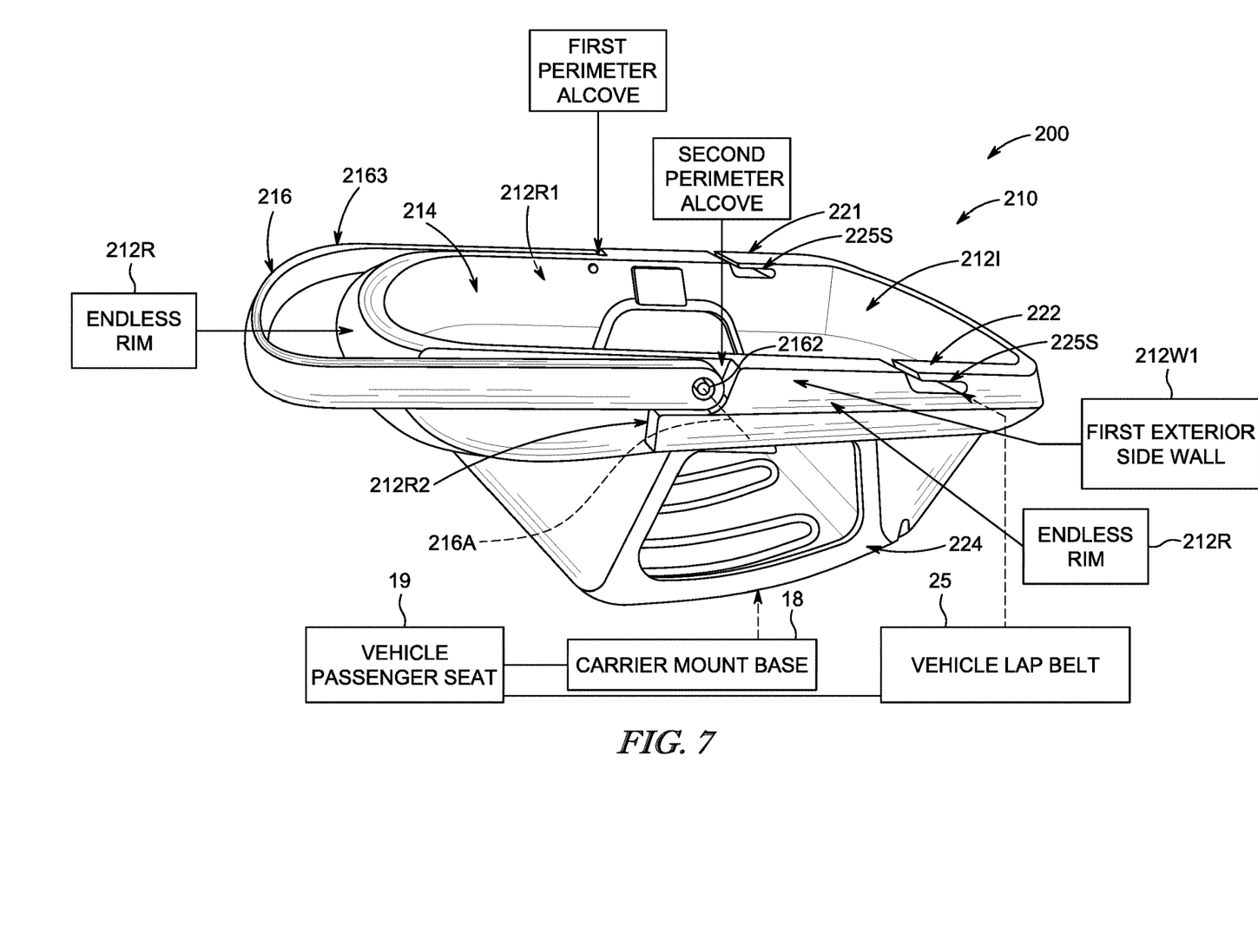
FIG. 7 is a front perspective view of a child restraint including an infant carrier in accordance with a second embodiment of the present disclosure showing that a first pivot hub of a carry handle is inset in a first perimeter alcove provided by a first handle-receiver channel formed in an endless rim of a carrier shell so that an outwardly facing exterior hub side face of the first pivot hub lies in the first handle-receiver channel without substantially protruding beyond an adjacent outwardly facing first exterior side wall of the endless rim.

An infant carrier 210 in accordance with a second embodiment of the present disclosure can be mounted by a caregiver in any suitable manner on a carrier-mount base 18 that is anchored in a stationary position on a vehicle passenger seat 19 to provide a child restraint 200 as suggested diagrammatically in FIG. 7. Infant carrier 210 and carrier-mount base 18 cooperate to form a child restraint 200 as suggested in FIG. 7. Alternatively, infant carrier 210 can be retained on a vehicle passenger seat 19 using a vehicle lap belt 25 passing through first and second belt receivers 221, 222 included in carrier shell 212 in accordance with the present disclosure without using carrier-mount base 18. Infant carrier 210 can be separated from carrier-mount base 18 or otherwise decoupled from vehicle lap belt 25 so that the caregiver can use carry handle 16 to transport an infant restrained on infant support 214 in carrier shell 212 away from a passageway seat 19 in a vehicle (not shown). First and second belt receivers 221, 222 are mounted in the top perimeter rim 212R that is included in a shell body 224 that is also included in carrier shell 212.

First and second belt receivers 221, 222 are inset into cut-outs formed in shell body 224 and mated with shell body 224 to form carrier shell 212 as suggested in FIG. 7. Each belt receiver 221, 222 is formed to include a belt-path slot 225S for receiving a portion of a vehicle lap belt 25 so that lap belt 25 anchors infant carrier 210 to vehicle passenger seat 19 when infant carrier 210 is desired to be restrained on vehicle passenger seat 19 without using carrier-mount base 18.

Infant carrier 210 includes a carrier shell 212 and a U-shaped carry handle 216 as shown in FIG. 7. Carrier shell 212 provides a space 2121 for supporting an infant (not shown). Carry handle 216 is mounted on carrier shell 212 for pivotable movement about a handle-pivot axis 16A between an extended child-carrying position shown in FIG. 8 and a retracted handle-storage position shown in FIGS. 7 and 9. Carrier shell 212 includes recesses formed in a perimeter rim 212R to provide first and second alcoves 212R1, 212R2 for receiving opposite handle ends 2161, 2162 of carry handle 216 so that those handle ends 2161, 2162 are flush with or inset in the perimeter rim 212R and do not protrude laterally outwardly to hit the leg or body of a caregiver carrying the infant carrier 210.

Each handle end 2161, 2162 of the pivotable U-shaped carry handle 216 lies within a companion perimeter alcove 212R1 or 212R2 formed in carrier shell 212 when the U-shaped carry handle 216 is pivoted to assume the extended child-carrying position without protruding substantially beyond the side of carrier shell 212 that is adjacent to the companion perimeter alcove 212R1, 212R2 as suggested in FIG. 5. The handle end 2161 or 2162 does not project outwardly beyond the side of carrier shell 212 to hit the leg or body of a caregiver holding the carry handle 216 to transport an infant restrained in carrier shell 212.

Figure 11:
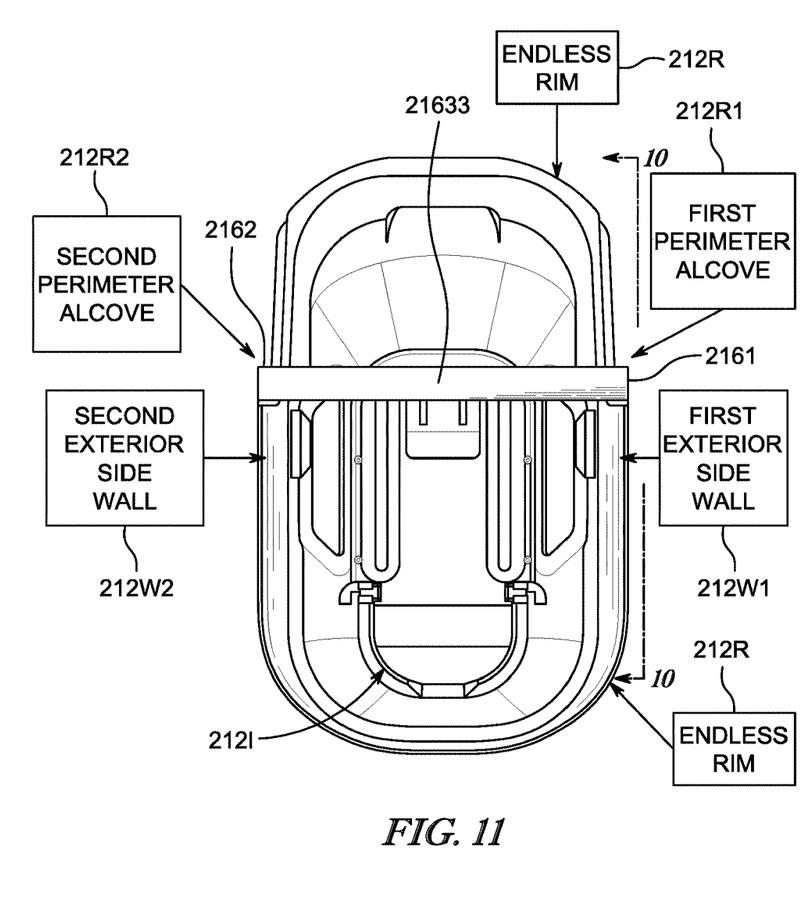
FIG. 11 is a top plan view of the infant carrier of FIGS. 9 and 10 showing that a second perimeter alcove is formed in the endless rim of the carrier shell to receive a second pivot hub (i.e. handle end) of the carry handle so that an outwardly facing exterior hub side face of the second hub lies in the second perimeter alcove without substantially protruding beyond an adjacent outwardly facing second exterior side wall of the endless rim.
Figure 12A:
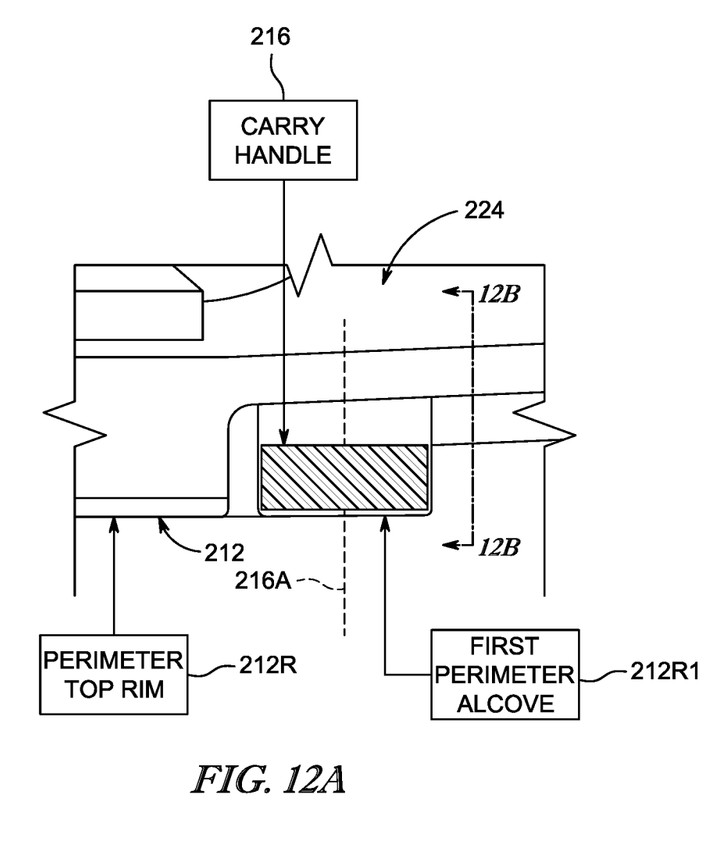
FIG. 12A is a sectional view taken along line 12A-12A of FIG. 10 to show that the first pivot hub does not protrude outwardly along the handle-pivot axis beyond the adjacent outwardly facing first exterior side wall of the endless rim of the carrier shell when the carry handle occupies the extended child-carrying position.
Figure 12B:
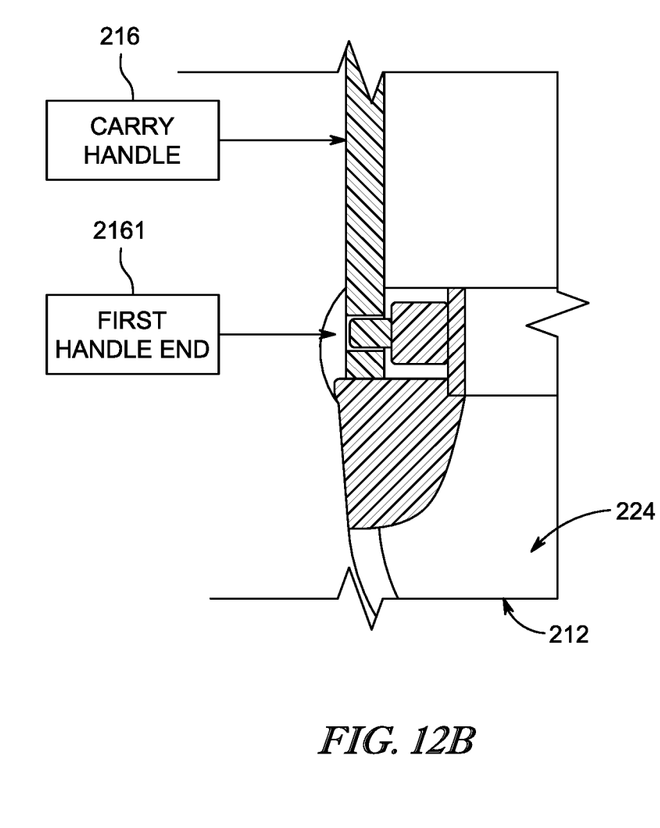
FIG. 12B is a sectional view taken along line 12B-12B of FIG. 12A.

Carrier shell 212 includes a top rim 212R that is arranged to extend along an upper perimeter of carrier shell 212. Top rim 212R includes an outwardly facing first exterior side wall 212W1 that is conceived of as generally straight as shown in FIGS. 7 and 11. A first perimeter alcove 212R1 sized to receive first handle end 2161 of the pivotable carry handle 216 is formed by an indentation in the outwardly facing first exterior side wall 212W1 of top rim 212R of carrier shell 212 as shown in FIGS. 8 and 9 so that the first handle end 2161 remains substantially within the first perimeter alcove 212R1 without protruding laterally outwardly beyond the outwardly facing first exterior side wall 212W1 of top rim 212R as shown in FIG. 11 in a way that would cause the first handle end 2161 to hit the adjacent leg or body of a caregiver holding the carry handle 216 to transport an infant restrained in carrier shell 212.

Top rim 212R of carrier shell 212 also includes an outwardly facing second exterior side wall 212W2 that is conceived of as generally straight as shown in FIG. 11. A second perimeter alcove 212R2 sized to receive second handle end 2162 of the pivotable carry handle 216 is formed by an indentation in the outwardly facing exterior side wall 212W2 of top rim 212R of carrier shell 212 as suggest in FIG. 11 so that the second handle end 2162 remains substantially within the second perimeter alcove 212R2 without protruding laterally outwardly beyond the outwardly facing second exterior side wall 212W2 of top rim 212R in a way that would cause the second handle end 2162 to hit the adjacent leg or body of a caregiver holding the carry handle 216 to transport an infant restrained in carrier shell 212.

Figure 8:
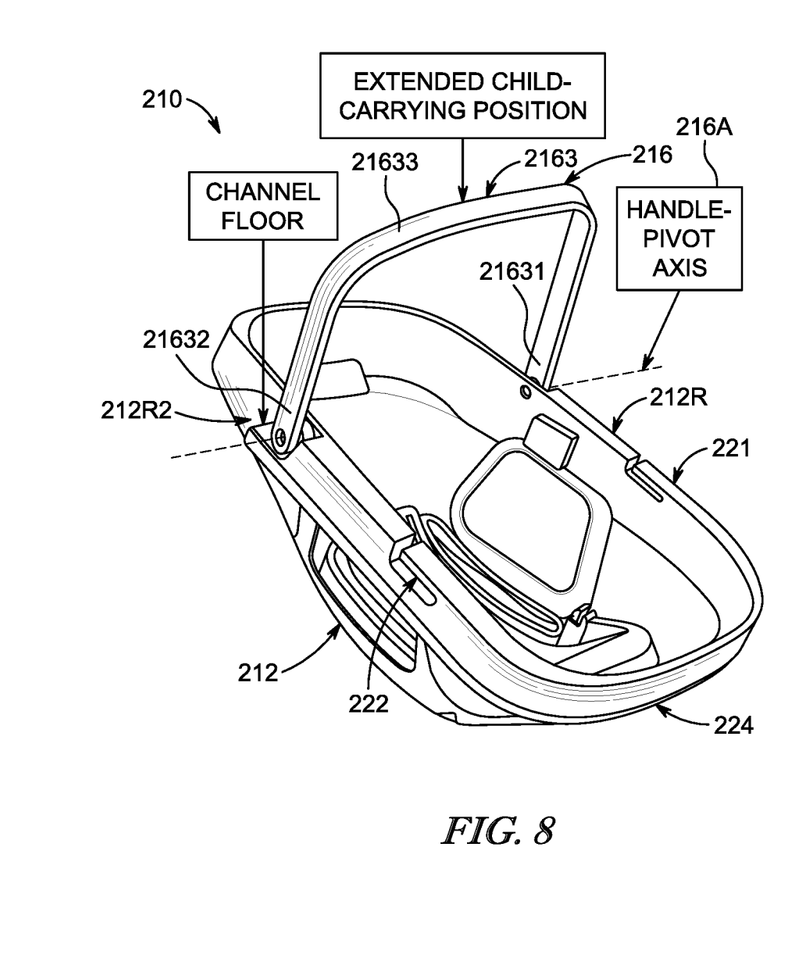
FIG. 8 is a rear perspective view of the infant carrier of FIG. 7 showing the carry handle in an extended child-carrying position that is arranged to extend upwardly away from the endless rim of the carrier shell and showing that the first pivot hub is located in the first handle-receiver channel above a channel floor defining a lower boundary of the first handle-receiver channel.
Figure 9:
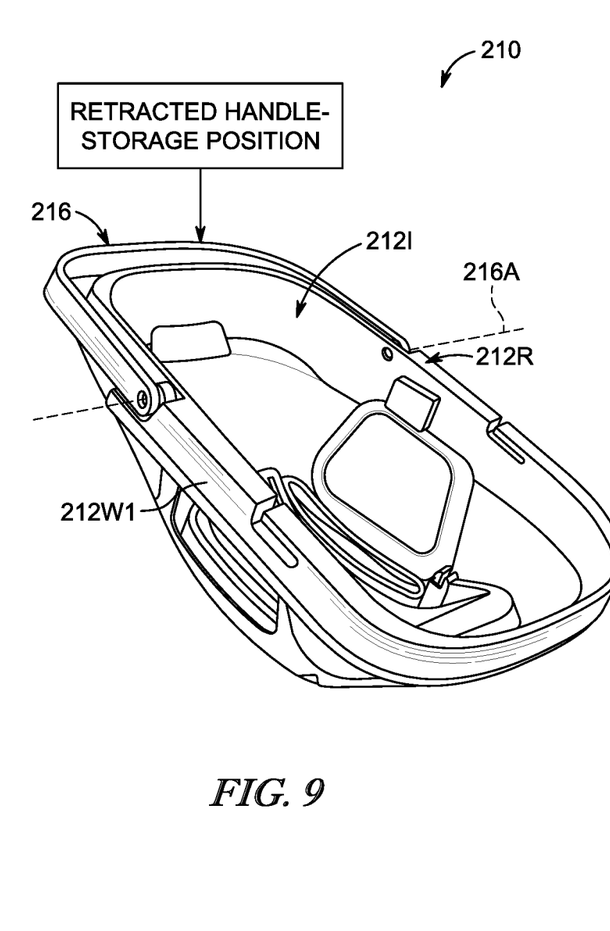
FIG. 9 is a perspective view similar to FIG. 8 showing the carry handle after it has been pivoted about a handle-pivot axis by a caregiver to assume a retracted handle-storage position and showing that the first pivot hub remains in an inset position in the first handle-receiver channel without protruding substantially beyond the adjacent outwardly facing first exterior side wall of the endless rim of the child carrier.
Figure 10:
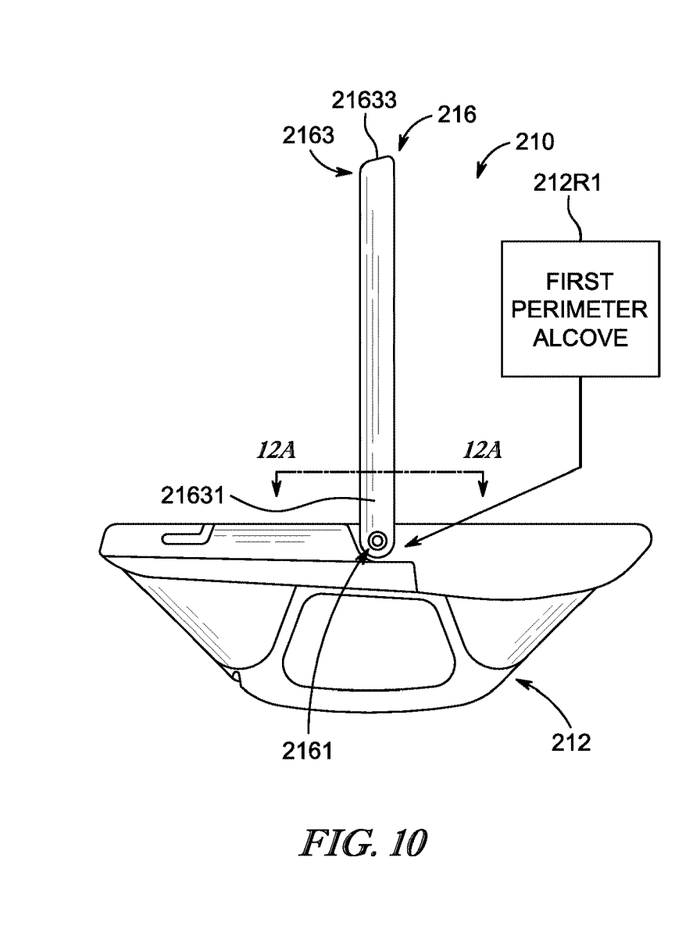
FIG. 10 is a side elevation view of the infant carrier of FIG. 9.

First handle end 2161 of carry handle 216 is a first (pivot) hub that is mounted on one side of carrier shell 212 in the first perimeter alcove 212R1 for rotation about handle-pivot axis 216A as shown in FIGS. 8 and 9. Carry handle 216 also includes a second handle end 2162 that provides a second (pivot) hub mounted on an opposite side of carrier shell 212 in a second perimeter alcove 212R2 for rotation about handle-pivot axis 216A. Carry handle 216 further includes a U shaped bail 2163 coupled to each of the first and second hubs 2161, 2162 to rotate therewith about handle-pivot axis 16A. Each pivot hub 2161, 2162 remains in its companion perimeter alcove 212R1 or 212R2 when carry handle 216 occupies the extended child-carrying position without projecting laterally outwardly beyond an adjacent side 212W1 or 212W2 of carrier shell 212 to hit the leg or body of or caregiver that is carrying the infant carrier 210.

Bail 2163 includes a first grip-support arm 21631 coupled to first pivot hub 2161 to rotate therewith, a second grip-support arm 21632 coupled to second pivot hub 2162 to rotate therewith, and a handgrip 21633 arranged to interconnect free ends of the first and second grip-support arms 21631, 21632. A caregiver can move the handgrip 21633 in a first direction toward a head end of carrier shell 212 to pivot carry handle 16 in a clockwise direction about the handle-pivot axis 216A to assume the retracted handle-storage position in which the U-shaped bail 2163 extends around head-end of the carrier shell 212. Alternatively, the caregiver can move handgrip 2163 in an opposite direction away from the head end of carrier shell 212 to pivot carry handle 216 in a counterclockwise direction about the handle-pivot axis 216A to assume the extended child-carrying position in which the U-shaped bail 2163 extends upwardly over the infant-supporting space 2121 formed in carrier shell 212 to allow the caregiver to hold carry handle 216 by handgrip 2163 and transport an infant placed in the infant-supporting space 2121 of carrier shell 212.

Carrier shell 212 includes a basin 224 and an endless rim 212R coupled to an upper edge of basin 224 and configured to cooperate with basin 224 to form infant-supporting space 2121. Endless rim 212R is formed to include an outwardly facing first exterior side wall 212W1 and a first recessed handle-receiver channel 212R1 interrupting the outwardly facing first exterior side wall 212W1 to provide space for receiving all 212R1 of the first pivot hub 2161 when carry handle 216 is pivoted to assume the extended child-carrying position. The handle-receiver channel 212R1 is formed to lie in a region located between the infant-receiving space 2121 and the outwardly facing first exterior side wall 212W1.

First pivot hub 2161 is arranged to extend into a first recessed handle-receiver channel 212R1 formed in a first side rail included in endless rim 212R of carrier shell 212 so as not to protrude outwardly along handle-pivot axis 216A beyond the adjacent outwardly facing first exterior side wall 212W1 of the first side rail. An outwardly facing exterior hub side wall 212S1 of first pivot hub 2161 is flush with or inset from the outwardly facing first exterior side wall 212W1 of a portion of the first side rail of endless rim 212R that is adjacent to first pivot hub 2161 so as to increase comfort of a caregiver when the caregiver holds handgrip 21633 to carry the carrier shell 212 and the first pivot hub 2161 in close proximity to the legs or body of the caregiver.

Second pivot hub 2162 is arranged to extend into a second recessed handle-receiver channel 212R2 formed in a second side rail included in endless rim 212R of carrier shell 212 so as not to protrude outwardly along handle-pivot axis 216A beyond the adjacent outwardly facing second exterior hub side wall 212W2 of the second side rail. An outwardly facing exterior side wall 212S2 of second pivot hub 2162 is flush with or inset from the outwardly facing second exterior side wall 212W2 of a portion of the second side rail of endless rim 212R that is adjacent to second pivot hub 2162 so as to increase comfort of a caregiver when the caregiver holds handgrip 2633 to carry the carrier shell 212 and the second pivot hub 2162 in close proximity to the legs or body of the caregiver.

Figure 13:
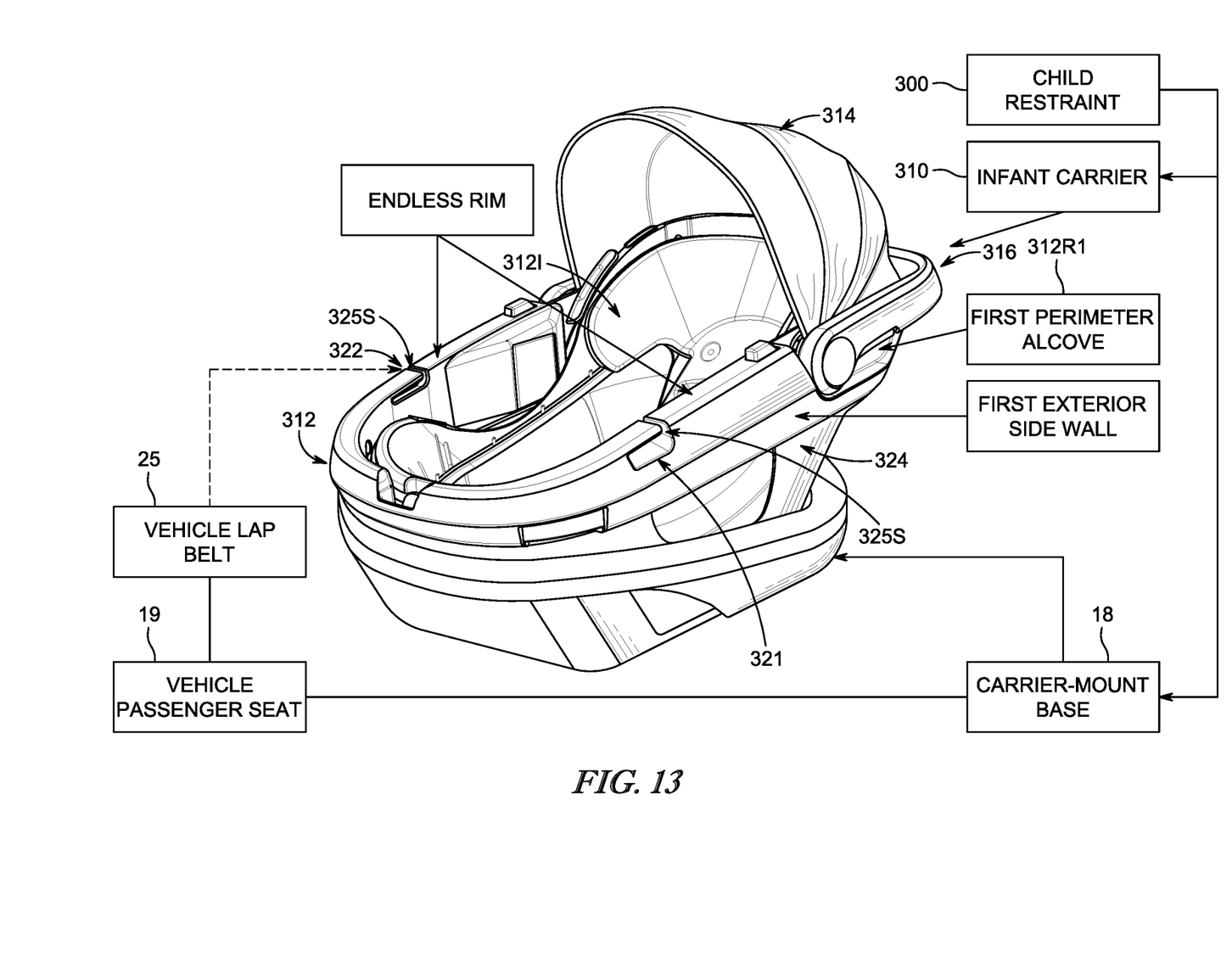
FIG. 13 is a front perspective view of another child restraint including an infant carrier in accordance with a second embodiment of the present disclosure showing that a first pivot hub of a carry handle is inset in a first perimeter alcove provided by a first handle-receiver channel formed in an endless rim of a carrier shell so that an outwardly facing exterior hub side face of the first pivot hub lies in the first handle-receiver channel without substantially protruding beyond an adjacent outwardly facing first exterior side wall of the endless rim.

An infant carrier 310 in accordance with a third embodiment of the present disclosure can be mounted by a caregiver in any suitable manner on a carrier-mount base 18 that is anchored in a stationary position on a vehicle passenger seat 19 to provide a child restraint 300 as suggested diagrammatically in FIG. 13. Infant carrier 310 and carrier-mount base 18 cooperate to form child restraint 300 as suggested in FIG. 13. Alternatively, infant carrier 310 can be retained on a vehicle passenger seat 19 using a vehicle lap belt 25 passing through first and second belt receivers 321, 322 included in carrier shell 312 in accordance with the present disclosure without using carrier-mount base 18. Infant carrier 310 can be separated from carrier-mount base 18 or otherwise decoupled from vehicle lap belt 25 so that the caregiver can use carry handle 316 to transport an infant restrained on infant support 314 in carrier shell 312 away from a passageway seat 19 in a vehicle (not shown). First and second belt receivers 321, 322 are mounted in the top perimeter rim 312R that is included in a shell body 324 that is also included in carrier shell 312.

First and second belt receivers 321, 322 are inset into cut-outs formed in shell body 324 and mated with shell body 324 to form carrier shell 312 as suggested in FIG. 13. Each belt receiver 321, 322 is formed to include a belt-path slot 325S for receiving a portion of a vehicle lap belt 25 so that lap belt 25 anchors infant carrier 310 to vehicle passenger seat 19 when infant carrier 310 is desired to be restrained on vehicle passenger seat 19 without using carrier-mount base 18.

Infant carrier 310 includes a carrier shell 312 and a U-shaped carry handle 316 as shown in FIG. 13. Carrier shell 312 provides a space 3121 for supporting an infant (not shown). Carry handle 316 is mounted on carrier shell 312 for pivotable movement about a handle-pivot axis 316A between an extended child-carrying position shown in FIG. 14 and a retracted handle-storage position shown in FIGS. 13 and 15. Carrier shell 312 includes recesses formed in a perimeter rim 312R to provide first and second alcoves 312R1, 312R2 for receiving opposite handle ends 3161, 3162 of carry handle 316 so that those handle ends 3161, 3162 are flush with or inset in the perimeter rim 312R and do not protrude laterally outwardly to hit the leg or body of a caregiver carrying the infant carrier 310.

Figure 17:
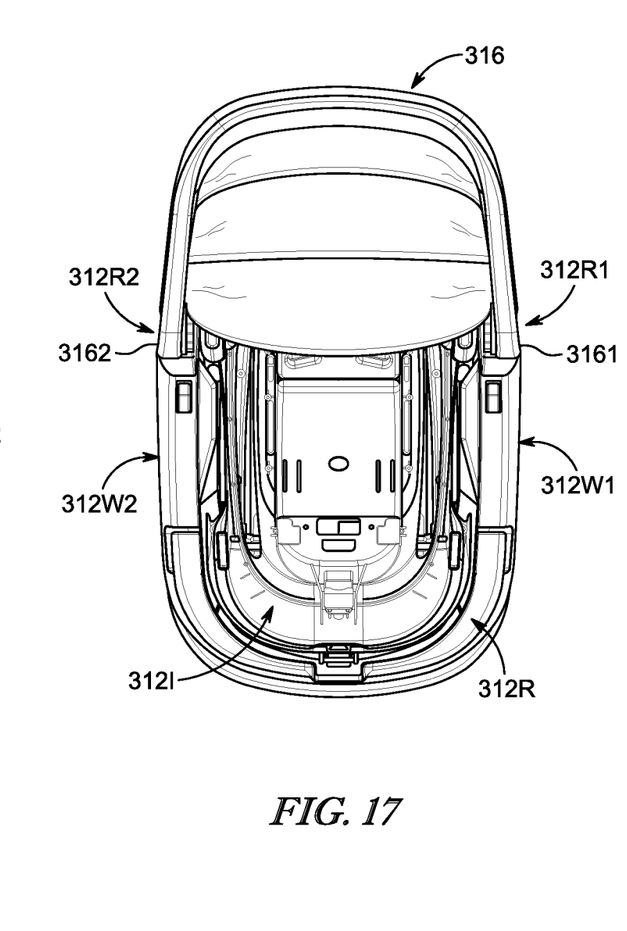
FIG. 17 is a top plan view of the infant carrier of FIGS. 15 and 16 showing that a second perimeter alcove is formed in the endless rim of the carrier shell to receive a second pivot hub (i.e. handle end) of the carry handle so that an outwardly facing exterior hub side face of the second hub lies in the second perimeter alcove without substantially protruding beyond an adjacent outwardly facing second exterior side wall of the endless rim.

Each handle end 3161, 3162 of the pivotable U-shaped carry handle 316 lies within a companion perimeter alcove 312R1 or 312R2 formed in carrier shell 312 when the U-shaped carry handle 316 is pivoted to assume the extended child-carrying position without protruding substantially beyond the side of carrier shell 312 that is adjacent to the companion perimeter alcove 312R1, 312R2 as suggested in FIG. 17. The handle end 3161 or 3162 does not project outwardly beyond the side of carrier shell 312 to hit the leg or body of a caregiver holding the carry handle 316 to transport an infant restrained in carrier shell 312.

Carrier shell 312 includes a top rim 312R that is arranged to extend along an upper perimeter of carrier shell 312. Top rim 312R includes an outwardly facing first exterior side wall 312W1 that is conceived of as generally straight as shown in FIGS. 13 and 17. A first perimeter alcove 312R1 sized to receive first handle end 3161 of the pivotable carry handle 316 is formed by an indentation in the outwardly facing first exterior side wall 312W1 of top rim 312R of carrier shell 312 as shown in FIGS. 14 and 15 so that the first handle end 3161 remains substantially within the first perimeter alcove 312R1 without protruding laterally outwardly beyond the outwardly facing first exterior side wall 312W1 of top rim 312R as shown in FIG. 17 in a way that would cause the first handle end 3161 to hit the adjacent leg or body of a caregiver holding the carry handle 316 to transport an infant restrained in carrier shell 312.

Top rim 312R of carrier shell 312 also includes an outwardly facing second exterior side wall 312W2 that is conceived of as generally straight as shown in FIG. 17. A second perimeter alcove 312R2 sized to receive second handle end 3162 of the pivotable carry handle 316 is formed by an indentation in the outwardly facing exterior side wall 312W2 of top rim 312R of carrier shell 312 as suggest in FIG. 17 so that the second handle end 3162 remains substantially within the second perimeter alcove 312R2 without protruding laterally outwardly beyond the outwardly facing second exterior side wall 312W2 of top rim 312R in a way that would cause the second handle end 3162 to hit the adjacent leg or body of a caregiver holding the carry handle 316 to transport an infant restrained in carrier shell 312.

Figure 14:
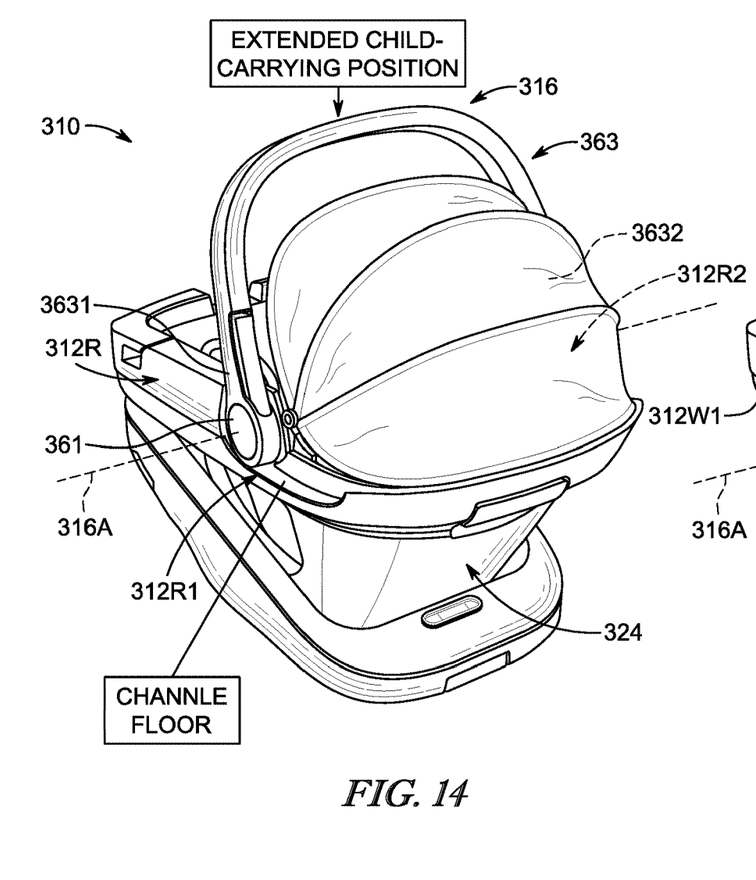
FIG. 14 is a rear perspective view of the infant carrier of FIG. 13 showing the carry handle in an extended child-carrying position that is arranged to extend upwardly away from the endless rim of the carrier shell and showing that the first pivot hub is located in the first handle-receiver channel above a channel floor defining a lower boundary of the first handle-receiver channel.
Figure 15:
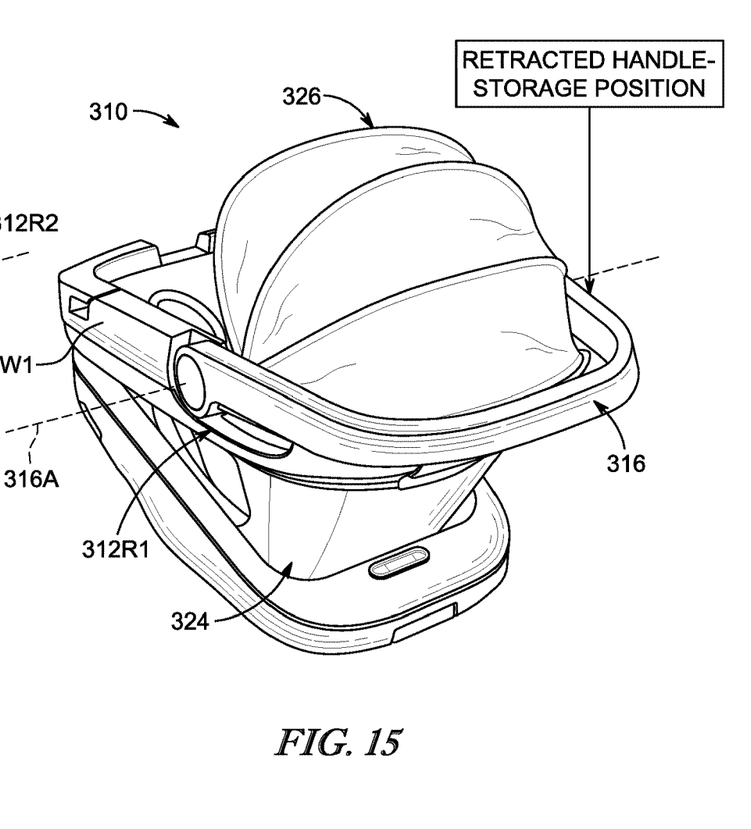
FIG. 15 is a perspective view similar to FIG. 14 showing the carry handle after it has been pivoted about a handle-pivot axis by a caregiver to assume a retracted handle-storage position and showing that the first pivot hub remains in an inset position in the first handle-receiver channel without protruding substantially beyond the adjacent outwardly facing first exterior side wall of the endless rim of the child carrier.

First handle end 3161 of carry handle 316 is a first (pivot) hub that is mounted on one side of carrier shell 312 in the first perimeter alcove 312R1 for rotation about handle-pivot axis 316A as shown in FIGS. 14 and 15. Carry handle 316 also includes a second handle end 3162 that provides a second (pivot) hub mounted on an opposite side of carrier shell 312 in a second perimeter alcove 312R2 for rotation about handle-pivot axis 316A. Carry handle 316 further includes a U-shaped bail 3163 coupled to each of the first and second hubs 3161, 3162 to rotate therewith about handle-pivot axis 316A. Each pivot hub 3161, 3162 remains in its companion perimeter alcove 312R1 or 312R2 when carry handle 316 occupies the extended child-carrying position without projecting laterally outwardly beyond an adjacent side 312W1 or 312W2 of carrier shell 312 to hit the leg or body of or caregiver that is carrying the infant carrier 310.

Figure 16:
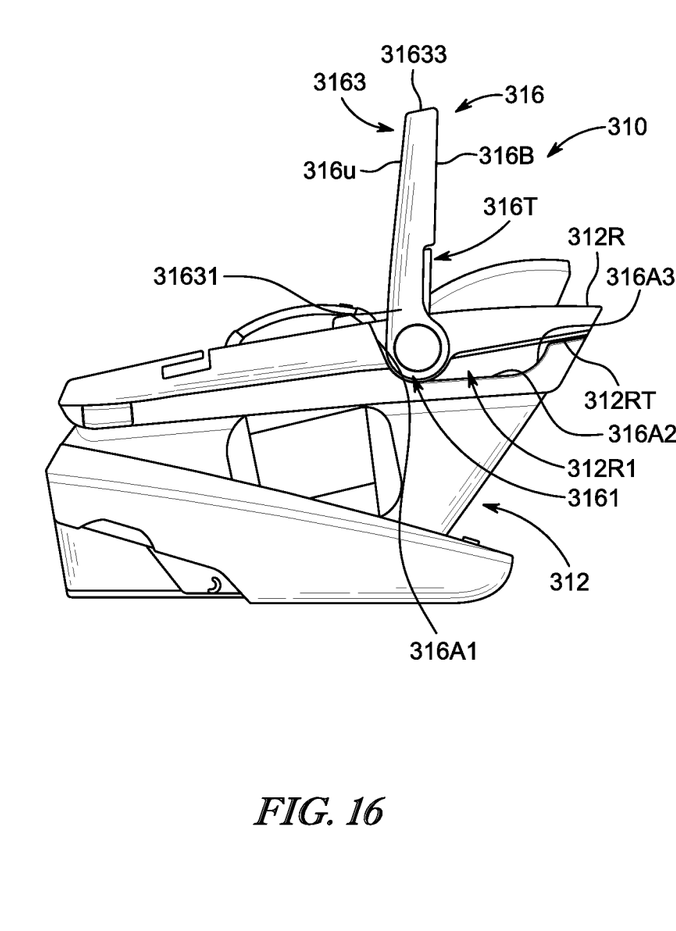
FIG. 16 is a side elevation view of the infant carrier of FIG. 9.

Each perimeter alcove 312R1, 312R2 is defined by a rearward-facing wall 312A1, an upward-facing surface 312A2, and a forward-facing surface 312A3 as shown in FIG. 16. Rearward-facing surface 312A1, upward-facing surface 312A2, and forward-facing surface cooperate to provide a pocket for receiving a user's hand to access a trigger 316T used to adjust carry handle 316 from the retracted handle-storage position to the extended child-carrying position. Upward-facing surface 316A2 is located relative to trigger 316T to provide a space therebetween when carry handle 316 is in the retracted handle-storage position. A height of rearward-facing surface 316A1 is greater than a height of forward-facing surface 316A3 relative to upward-facing surface 316A2. This allows a bottom surface 316B of carry handle 316 to contact top surface 312RT directly rearward from forward-facing surface 316A3 such that an upper surface 316U is flush with endless rim 312R in the retracted handle-storage position.

Bail 3163 includes a first grip-support arm 31631 coupled to first pivot hub 3161 to rotate therewith, a second grip-support arm 31632 coupled to second pivot hub 3162 to rotate therewith, and a handgrip 31633 arranged to interconnect free ends of the first and second grip-support arms 31631, 31632. A caregiver can move the handgrip 31633 in a first direction toward a head end of carrier shell 312 to pivot carry handle 316 in a clockwise direction about the handle-pivot axis 316A to assume the retracted handle-storage position in which the U-shaped bail 3163 extends around head-end of the carrier shell 312. Alternatively, the caregiver can move handgrip 3163 in an opposite direction away from the head end of carrier shell 312 to pivot carry handle 316 in a counterclockwise direction about the handle-pivot axis 316A to assume the extended child-carrying position in which the U-shaped bail 3163 extends upwardly over the infant-supporting space 3121 formed in carrier shell 312 to allow the caregiver to hold carry handle 316 by handgrip 3163 and transport an infant placed in the infant-supporting space 3121 of carrier shell 312.

Carrier shell 312 includes a basin 324 and an endless rim 312R coupled to an upper edge of basin 324 and configured to cooperate with basin 324 to form infant-supporting space 3121. Endless rim 312R is formed to include an outwardly facing first exterior side wall 312W1 and a first recessed handle-receiver channel 312R1 interrupting the outwardly facing first exterior side wall 312W1 to provide space for receiving all 312R1 of the first pivot hub 3161 when carry handle 316 is pivoted to assume the extended child-carrying position. The handle-receiver channel 312R1 is formed to lie in a region located between the infant-receiving space 3121 and the outwardly facing first exterior side wall 312W1.

First pivot hub 3161 is arranged to extend into a first recessed handle-receiver channel 312R1 formed in a first side rail included in endless rim 312R of carrier shell 312 so as not to protrude outwardly along handle-pivot axis 316A beyond the adjacent outwardly facing first exterior side wall 312W1 of the first side rail. An outwardly facing exterior hub side wall 312S1 of first pivot hub 3161 is flush with or inset from the outwardly facing first exterior side wall 312W1 of a portion of the first side rail of endless rim 312R that is adjacent to first pivot hub 3161 so as to increase comfort of a caregiver when the caregiver holds handgrip 31633 to carry the carrier shell 312 and the first pivot hub 3161 in close proximity to the legs or body of the caregiver.

Second pivot hub 3162 is arranged to extend into a second recessed handle-receiver channel 312R2 formed in a second side rail included in endless rim 312R of carrier shell 312 so as not to protrude outwardly along handle-pivot axis 316A beyond the adjacent outwardly facing second exterior hub side wall 312W2 of the second side rail. An outwardly facing exterior side wall 312S2 of second pivot hub 3162 is flush with or inset from the outwardly facing second exterior side wall 312W2 of a portion of the second side rail of endless rim 312R that is adjacent to second pivot hub 3162 so as to increase comfort of a caregiver when the caregiver holds handgrip 3633 to carry the carrier shell 312 and the second pivot hub 3162 in close proximity to the legs or body of the caregiver.

The invention claimed is:

1. An infant carrier comprising
a carrier shell formed to include an interior region sized to support an infant and a top rim arranged to surround the interior region and
a carry handle mounted on the carrier shell for pivotable movement about a handle-pivot axis between an extended child-carrying position and a retracted handle-storage position, wherein the carry handle includes opposite handle ends mounted on the carrier shell and at least one handle button configured to be accessed by a user to adjust the carry handle from the retracted handle-storage position to the extended child-carrying position or from the extended child-carrying position to the retracted handle-storage position,
wherein the carrier shell includes alcove means formed in the perimeter rim for receiving the opposite handle ends and the at least one handle button of the carry handle so that the opposite handle ends and the at least one handle button are flush with or inset in the perimeter rim and do not protrude laterally outwardly away from the perimeter rim.

2. The infant carrier of claim 1, wherein a first of the handle ends of the carry handle lies with a companion first perimeter alcove included in the alcove means when the carry handle is pivoted to assume the extended child-carrying position without protruding in a first direction beyond a portion of the perimeter rim of the carrier shell that is adjacent to the first perimeter alcove.

3. The infant carrier of claim 2, wherein a second of the handle ends of the carry handle lies within a companion second perimeter alcove included in the alcove means when the carry handle is pivoted to assume the extended child-carrying position without protruding in an opposite second direction along the handle-pivot axis beyond a portion of the perimeter rim of the carrier shell that is adjacent to the second alcove.

4. The infant carrier of claim 3, wherein the first of the handle ends lies within the companion first perimeter alcove and the second of the handle ends lies within the companion second perimeter alcove when the carry handle is pivoted to assume the retracted handle-storage position.

5. The infant carrier of claim 1, wherein the carrier shell further includes a basin, the top rim is arranged to extend along an upper perimeter of the basin and cooperate with the basin to form the interior region of the carrier shell, and the perimeter rim includes an outwardly facing first exterior side wall that is located on a first side of the basin and is conceived of as generally straight and is formed to include an indentation to provide a first perimeter alcove.

6. The infant carrier of claim 5, wherein the top rim of the carrier shell also includes an outwardly facing second exterior side wall located on an opposite second side of the basin and is conceived of as generally straight and is formed to include an indentation to provide a second perimeter alcove.

7. The infant carrier of claim 6, wherein the first of the handle ends is a first pivot hub that is mounted on a first side of the carrier shell in the first perimeter alcove for pivotable rotation about the handle-pivot axis, the second of the handle ends is a second pivot hub that is mounted on an opposite second side of the carrier shell in the second perimeter alcove for pivotable rotation about the handle-pivot axis, and wherein the carry handle further includes a U-shaped bail coupled to each of the first and second pivot hubs to rotate therewith about the handle-pivot axis to cause each of the first or second pivot hubs to remain in its companion perimeter alcove when the carry handle occupies the extended child-carrying position without projecting laterally outwardly the companion outwardly facing first or second exterior side wall.

8. The infant carrier of claim 1, wherein the alcove means is provided by a rearward-facing surface, an upward-facing surface coupled to the rearward-facing surface, and a forward-facing surface coupled to the upward-facing surface and spaced apart from the rearward-facing surface, the rearward-facing surface, the upward-facing surface, and the forward-facing surface cooperate to provide a pocket so that a user can access the handle button of the carry handle to adjust the carry handle from the retracted handle-storage position to the extended child-carrying position.

9. An infant carrier comprising
a carrier shell including a basin and an endless rim coupled to an upper edge of the basin to form an infant-receiving space and
a carry handle mounted on the carrier shell for pivotable movement between an upwardly extended child-carrying position and a rearwardly retracted handle-storage position,
wherein the endless rim is formed to include a first exterior side wall facing outwardly away from the infant-receiving space and a recessed first handle-receiver channel interrupting the first exterior side wall to provide first alcove means for receiving all of a first pivot hub included in a first end of the carry handle when the carry handle is pivoted to assume the upwardly extended child-carrying position, and
wherein the alcove means is provided by a rearward-facing surface, an upward-facing surface coupled to the rearward-facing surface, and a forward-facing surface coupled to the upward-facing surface and spaced apart from the rearward-facing surface, the rearward-facing surface, the upward-facing surface, and the forward-facing surface cooperate to provide a pocket so that a user can access a trigger of the carry handle to adjust the carry handle from the retracted handle-storage position to the extended child-carrying position.

10. The infant carrier of claim 9, wherein the first handle-receiver channel is formed to lie in a region located between the infant-receiving space and the first exterior side wall.

11. The infant carrier of claim 10, wherein the first pivot hub is arranged to extend into the first recessed handle-receiver channel formed in a first side rail included in the endless rim of the carrier shell so as not to protrude outwardly in a first direction along the handle-pivot axis beyond the first exterior side wall of the first side rail.

12. The infant carrier of claim 9, wherein the first pivot hub is arranged to extend into the first recessed handle-receiver channel formed in a first side rail included in the endless rim of the carrier shell so as not to protrude outwardly in a first direction along the handle-pivot axis beyond the first exterior side wall of the first side rail.

13. The infant carrier of claim 12, wherein an outwardly facing exterior hub wall of the first pivot hub faces way from the infant-receiving space and is flush with or inset from the exterior first side wall of a portion of the first side rail of the endless rim that is adjacent to the first pivot hub.

14. The infant carrier of claim 13, wherein a second pivot hub included in an opposite second end of the carry handle is arranged to extend into a second recessed handle-receiver channel formed in a second side rail included in the endless rim of the carrier shell to provide means for receiving all of the second pivot hub when the carry handle is pivoted to assume the upwardly extended child-carrying position so as not to protrude outwardly in an opposite second direction beyond the second exterior side wall of the second side rail.

15. The infant carrier of claim 14, wherein an outwardly facing exterior hub wall of the second pivot hub faces away from the infant-receiving space and is flush with or inset from the exterior second side wall of a portion of the second side rail of the endless rim that is adjacent to the second pivot hub.

16. The infant carrier of claim 9, wherein a height of the rearward-facing surface is greater than a height of the forward-facing surface relative to the upward-facing surface to allow a bottom surface of the carry handle to contact a top surface of the carrier shell directly rearward from forward-facing surface such that an upper surface of the carry handle is flush with the endless rim in the retracted handle-storage position.

* * * * *